US012154353B2

(12) United States Patent
Gloger et al.

(10) Patent No.: US 12,154,353 B2
(45) Date of Patent: Nov. 26, 2024

(54) METHOD FOR DETECTING LIGHT CONDITIONS IN A VEHICLE

(71) Applicant: Conti Temic microelectronic GmbH, Nuremberg (DE)

(72) Inventors: Charlotte Gloger, Ulm (DE); Martin Buerker, Ulm (DE); Andreas Panakos, Ulm (DE); Markus Friebe, Gefrees (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 971 days.

(21) Appl. No.: 16/973,912

(22) PCT Filed: Sep. 3, 2019

(86) PCT No.: PCT/DE2019/200107
§ 371 (c)(1),
(2) Date: Dec. 10, 2020

(87) PCT Pub. No.: WO2020/064065
PCT Pub. Date: Apr. 2, 2020

(65) Prior Publication Data
US 2021/0256278 A1 Aug. 19, 2021

(30) Foreign Application Priority Data
Sep. 27, 2018 (DE) ..................... 10 2018 216 562.9

(51) Int. Cl.
*G06V 20/59* (2022.01)
*B60J 3/04* (2006.01)
(Continued)

(52) U.S. Cl.
CPC ................ *G06V 20/59* (2022.01); *B60J 3/04* (2013.01); *B60K 35/00* (2013.01); *B60K 35/415* (2024.01)

(58) Field of Classification Search
CPC ............ B60Q 2300/42; B60Q 2300/41; B60Q 2300/056; B60Q 2300/314; G06V 20/59; B60J 3/04; B60K 35/00; B60K 2370/37
See application file for complete search history.

(56) References Cited

U.S. PATENT DOCUMENTS

| 5,305,012 A | 4/1994 | Faris |
| 2003/0169213 A1* | 9/2003 | Spero ................. G02B 27/0093 345/7 |

(Continued)

FOREIGN PATENT DOCUMENTS

| DE | 199 33 397 | 1/2001 |
| DE | 103 38 764 | 6/2005 |

(Continued)

OTHER PUBLICATIONS

English translation of the International Search Report of the International Searching Authority for International Application PCT/DE2019/200107, mailed Nov. 29, 2019, 2 pages, European Patent Office, HV Rijswijk, Netherlands.

(Continued)

*Primary Examiner* — Justin S Lee
(74) *Attorney, Agent, or Firm* — Buchanan, Ingersoll & Rooney PC

(57) ABSTRACT

The invention relates to a driver assistance system (100) for a vehicle (105) for detecting light conditions in the vehicle (105), having a sensor arrangement (102, 103, 104) designed to capture sensor data, and having a control device (101) designed to ascertain if the sight of a driver of the vehicle (105) is negatively influenced by a source of stray light external to the vehicle.

12 Claims, 4 Drawing Sheets

Figure 1:
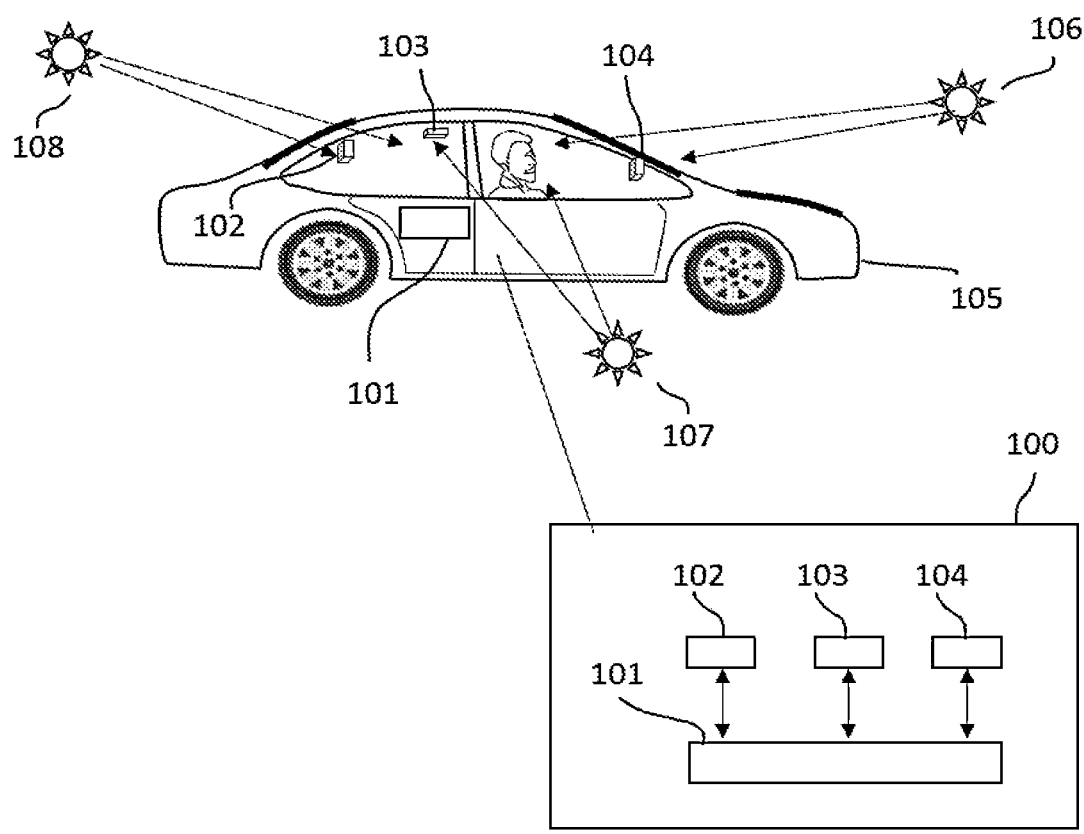

(51) Int. Cl.
*B60K 35/00* (2006.01)
*B60K 35/40* (2024.01)

(56) References Cited

U.S. PATENT DOCUMENTS

| | | | |
|---|---|---|---|
| 2010/0091513 A1* | 4/2010 | Kamioka | G06V 20/584 348/148 |
| 2010/0213846 A1* | 8/2010 | Thomas | B60Q 1/1423 362/464 |
| 2015/0098612 A1* | 4/2015 | Sato | G01J 3/46 382/103 |
| 2015/0310284 A1* | 10/2015 | Sakamoto | B62D 15/025 382/104 |
| 2016/0042531 A1* | 2/2016 | Nolan | H04N 23/80 348/135 |
| 2016/0209927 A1* | 7/2016 | Yamagishi | G06F 3/0304 |
| 2016/0306169 A1* | 10/2016 | Nambara | G02B 27/0101 |
| 2016/0363993 A1 | 12/2016 | Leng | |
| 2017/0195605 A1* | 7/2017 | Alves | H04N 23/6811 |
| 2018/0126907 A1* | 5/2018 | Jeromin | B60R 1/006 |
| 2018/0144199 A1* | 5/2018 | Perez Barrera | G06V 20/58 |
| 2018/0162203 A1* | 6/2018 | Boehm | B60Q 9/00 |
| 2018/0233092 A1* | 8/2018 | Du | G09G 3/2092 |
| 2018/0334099 A1* | 11/2018 | Gao | G06F 3/147 |
| 2019/0204627 A1* | 7/2019 | Wang | G02F 1/0136 |
| 2020/0148094 A1* | 5/2020 | Boehm | H05B 47/125 |

FOREIGN PATENT DOCUMENTS

| | | | |
|---|---|---|---|
| DE | 102005045436 | 3/2007 | |
| DE | 102006036976 | 2/2008 | |
| DE | 102016222911 | 5/2018 | |
| DE | 102018005869 A1 * | 1/2020 | G01C 21/32 |
| JP | 2008-044603 A | 2/2008 | |
| WO | WO 2017/190166 | 11/2017 | |

OTHER PUBLICATIONS

PCT International Preliminary Report on Patentability including English Translation of PCT Written Opinion of the International Searching Authority for International Application PCT/DE2019/200107, issued Mar. 23, 2021, 6 pages, International Bureau of WIPO, Geneva, Switzerland.

German Search Report for German Patent Application No. 10 2018 216 562.9, dated Apr. 11, 2019, 8 pages, German Patent and Trademark Office, Muenchen, Germany, with English partial translation, 6 pages.

European Examination Report for EP Application No. 19 773 736.4, dated May 2, 2022 with translation, 9 pages.

* cited by examiner

METHOD FOR DETECTING LIGHT CONDITIONS IN A VEHICLE

The invention relates to a system and a method for detecting light conditions in a vehicle, wherein a negative influence on the driver of the vehicle is established and, as a function of the established negative influence, measures to counter the negative influence are initiated. A stray light effect can, for example, be a dazzling effect on the driver.

Difficult visibility conditions frequently pose a problem while driving in road traffic. Said difficult visibility conditions can be produced by dazzling by the sun, by a rapid change in brightness such as, by way of example, when driving along a group of trees through which a low-lying sun is shining, or by the dazzling effect of headlights of other vehicles at night.

It is an object of the invention to improve safety in road traffic.

The object is achieved by a driver assistance system and a method according to the features of the independent claims. Furthermore, a vehicle which has such a system is proposed. The dependent claims, which each refer back to the independent claims, outline advantageous further developments of the invention.

According to an aspect, a driver assistance system for a vehicle has a sensor arrangement which is designed to capture sensor data. Furthermore, the driver assistance system has a control device designed to ascertain if the sight of a driver of the vehicle is negatively influenced by a source of stray light external to the vehicle.

The negative influence of light on the driver can in principle be divided up into two categories. On the one hand, it can be a direct or indirect dazzling of the driver; i.e. the light falls substantially directly into the driver's eyes. The light can immediately hit the driver's eyes. However, the light can also hit the driver's eyes as a result of a deflection and/or reflections. In particular, this means that a source of reflection and/or deflection is still present between the light and the driver, which source captures the light and then transmits it into the driver's eyes. For example, mirrors or metal surfaces, such as by way of example a vehicle body, in particular a hood, are conceivable as a source of reflection and/or deflection. This adversely affects the driver's sight, which can lead to hazardous situations. On the other hand, the disturbing incidence of light can lead to an adverse effect on the legibility of displays such as e.g. the instrument panel having the speed display or the display of a navigation unit.

According to an embodiment, the control device is designed to take measures in order to reduce the negative influence on the driver caused by the source of stray light, if a negative influence has been ascertained.

This means that the control device adopts measures, by way of example, to counter the dazzling, and measures to improve the legibility of the displays. For example, measures in both cases can involve darkening the windows, increasing the light intensity of the display or interrupting the light path of the disturbing, incident light from outside the vehicle.

According to an embodiment, the control device is designed to determine interference-sensitive coordinates regarding the negative influence in the vehicle;
 the sensors are designed to capture images of the vehicle surroundings; and
 the control device is designed to detect the sources of stray light in the images, to calculate the coordinates of the sources of stray light, to determine the interference-sensitive coordinates, and to establish, on the basis of the coordinates of the sources of stray light and the interference-sensitive coordinates, if there is a negative influence on the driver.

Interference-sensitive coordinates regarding the negative influence are to be understood to be the coordinates on which the light falls, as a result of which the driver is negatively influenced. For example, these coordinates are position and direction coordinates of the eyes and the display. However, the term also denotes the positions and directions of reflectors such as e.g. mirrors.

In order to be able to establish the negative influence, images of the vehicle surroundings are first captured with cameras and the camera images are analyzed. The cameras capture, in particular, images from all sides of the vehicle, i.e. from the left and the right side, the rear and the front of the vehicle. The images can also be extracted from a video sequence.

The sources of stray light can, for example, be detected by capturing lens flares, such as reflections, or sources of stray light which are reflected in light regions of the image. Lens reflections are caused by extreme light situations in specific regions of the camera chip and point to light sources such as sunlight or strong reflections in the surroundings. The coordinates of the light source, which can constitute a stray light, are determined from the two-dimensional image and the camera calibration matrices in such a way that at least the direction of incidence of the light or the position of the light source is known in a three-dimensional manner.

The coordinates of the source of stray light can be calculated in different ways. According to an exemplary embodiment, the source of stray light can have a deterministic background such as e.g. the course of the sun as a function of the day and time. This makes it possible, by way of example, to predict the light incidence. After a stray light has been ascertained on the image, which stray light matches the coordinates or the angle of incidence of the sun and—possibly following a further plausibility check—can be allocated to the sun, the course of the road from a navigation unit, weather data, or data of another vehicle can additionally be considered as well for the calculation or plausibility check. In addition, it can be checked if the sun is a source of disturbance even if it does not appear on the images, e.g. because it is too high in the sky to be captured by the cameras, or is at such a position that it or its radiation is deflected or reflected by a source of reflection and/or deflection into the images.

In order to now determine if the driver is adversely affected by the incidence of light, the geometry of the vehicle and the position of the eyes or the eye level must be considered.

Since the cameras are not located at the position of the driver, it is possible that an incidence of light which is depicted on the image does not dazzle the driver, e.g. due to the shading provided by the roof of the vehicle. In order to carry out the calculation regarding the position of the driver, or the latter's eyes, the latter's eye level is first determined.

In order to determine the eye level, the driver could e.g. indicate his height, or a standard height is used. The standard height can be, by way of example, a standard height for men or a standard height for women. The height or the coordinates of the eyes can, furthermore, be detected by e.g. a camera or by other sensors. Furthermore, it would be possible to use the height adjustment of the neck supports, which is captured e.g. electronically, for the determination of the eye level.

The coordinates must be in the same coordinate system as the coordinate system used for the calculation of the incidence of light. E.g. a world coordinate system, that is to say a so-called ECEF (earth-centered earth-fixed) system or a geodetic coordinate system such as, for example, the WGS84 (World Geodetic System) system used for GPS can be used as a common reference system for all of the components, that is to say the light source or the angle of incidence, the position and alignment of the vehicle, as well as the position of the light source on the captured image or the position and direction of the light source or light sources derived therefrom. The coordinates can, however, also be converted into a local, by way of example vehicle-related, coordinate system. The alignment of the vehicle can be determined or estimated e.g. by means of sensors such as e.g. GPS, compass, gyrometer, etc.

The sun is calculated, for example, as an azimuth of the geographical length and elevation above the horizon, GPS coordinates are usually output in WGS84 and the vehicle with its geometry and the indication of the eye level have a local coordinate system fixed on the vehicle. Consequently, coordinate transformations into a similar coordinate system have to be carried out.

Consequently, it can now be determined on the basis of the geometry of the vehicle, i.e. including the body, the windows, etc. as well as the position of the eyes and the established angle of incidence, if the driver is adversely affected or negatively influenced while driving.

According to an embodiment, the control device is further designed to establish a negative influence on the driver in terms of a direct dazzling of the driver, and to implement measures in order to avoid the dazzling. The driver is, in this case, dazzled by light hitting his eyes directly from the front or from the side. The light is captured in the images of the front or the lateral cameras, the coordinates of the light source or of the angle of incidence in terms of the driver's eyes, are calculated and, if it has been possible to establish a dazzling effect, measures to counter a dazzling effect are implemented. The measures in this case involve, for example, darkening the windows or moving a semi-transparent or optically opaque shutter to positions which mitigate or prevent the disturbing incidence of light.

According to an embodiment, the control device is further designed to establish a negative influence on the driver in terms of an indirect dazzling of the driver, and to implement measures in order to avoid the dazzling. This embodiment thus comprises calculating coordinates of the sources of stray light on the basis of the images and calculating reflections off vehicle parts. Consequently, reflections off the hood are calculated by means of the image captured by the front camera and the coordinates or angles established therefrom and a dazzling effect is checked or, if the image of the rear camera has captured the light source, it is checked if the driver is being dazzled due to a reflection off the rearview mirror. The possible measures are, in this case, similar to those for a direct dazzling effect.

According to an embodiment, the control device is further designed to establish a negative influence on the driver in terms of the legibility of displays, and to implement measures in order to increase the legibility of the displays. The sources of disturbance are, in this case, captured by lateral or rear-facing cameras. The measures can, for example, involve increasing the brightness or the contrast of the display, or also one of the aforementioned measures for preventing or mitigating the disturbing incidence of light, inasmuch as this does not impede the driver's sight which, in this case, should take priority.

A planar stray light, as caused by way of example by a reflective field of snow or a water surface, can also be detected by the captured images. A direction vector can also be determined and appropriate measures such as darkening the windows or increasing the display contrast can be taken.

Accordingly, darkness can also be captured, which has the consequence e.g. of adjusting, in this case reducing, the brightness of a display, so that the driver is not dazzled by this, or reducing the window tinting. Outwardly, the headlights can e.g. be switched on.

In order to determine those light conditions which have an effect over a large area, the average illumination of the camera can for example also be monitored over time. If the illumination increases drastically, including from one day to the next, it is possible that the driver will experience visual impairment.

According to an embodiment, the measure to counter the negative influence brings about a change in status, and the control device is designed to implement the change in status over a period of time. The measure to darken the windows or increase the display brightness can be configured such that a fluid transition to the previous status is effected. Consequently, the fact that eyes only gradually adjust to new brightness conditions is considered. This also prevents flickering in the event of rapid changes from light to dark, e.g. while driving between trees.

According to an embodiment, the driver assistance system further has a communication channel. The occurrence of negative influences or sources of stray light is communicated as an information package, together with location information, via said communication channel. This embodiment includes both the sending and the receiving of data regarding the occurrence of negative influences or sources of stray light. The driver can thus be warned where and in what way he is being adversely affected and can adjust his quality of driving accordingly. The measures described above can be taken promptly and with a gentle transition.

Communication channels can be, for example, Car2Car communication or a central server on which a database is installed. By way of example, it can be determined from Car2Car driving data of another vehicle if the two vehicles will meet. One measure which can be taken would be, for example, automatically switching off high beam so as not to dazzle the other vehicle, or adjusting the dimmed headlights.

The position, at which e.g. a dazzling effect exists due to sunlight, can also be transferred to a database outside of the vehicle so that other vehicles can be warned, utilizing this database. Such a database can be an already existing database which contains e.g. a road status or other road- or route-related data.

According to an embodiment, a personalized profile is created for at least one calculation or one measure. The control device is designed to access the personalized profile for at least one calculation or one measure. This can be, for example, a configuration file, in which data regarding the height of a specific driver are stored, so that the eye level can be calculated. This can, furthermore, be a configuration in which a mirror adjustment is saved so that, at the start of the journey, the mirrors are adjusted for a specific person and the angles of the mirrors are incorporated into the calculations. Furthermore, the driver can e.g. indicate the degree of darkening or the maximum darkening, or which measures should or should not be executed.

According to an aspect, a driver assistance method for detecting light conditions is provided, having the following steps of:

capturing sensor data;
ascertaining if the sight of a driver of the vehicle is negatively influenced by a source of stray light external to the vehicle.

According to an embodiment, ascertaining if the sight of a driver of the vehicle is negatively influenced by a source of stray light external to the vehicle furthermore has the following steps of:

detecting (102) sources of stray light in the images,
calculating (103) coordinates of the sources of stray light,
determining (104) interference-sensitive coordinates,
determining (105), on the basis of the coordinates of the sources of stray light and the interference-sensitive coordinates, if there is a negative influence on the driver.

Figure 2:
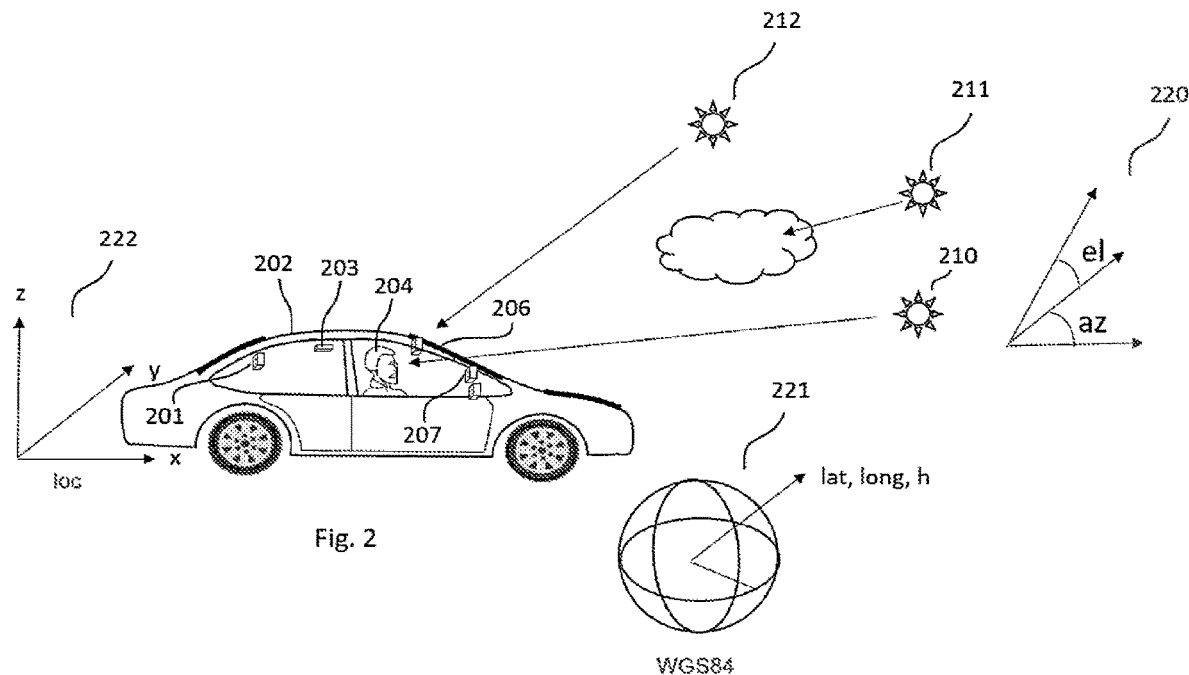
Figure 3:
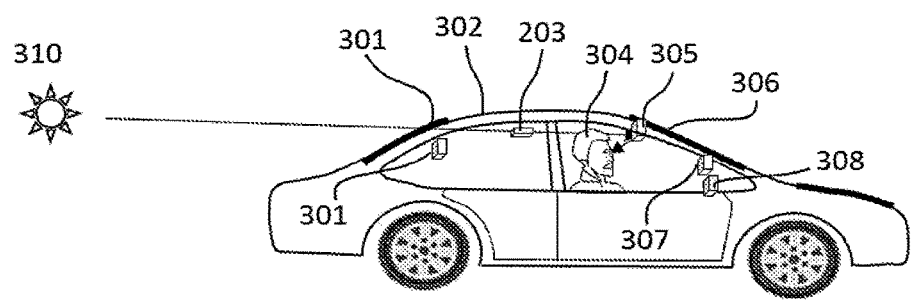
Figure 4:
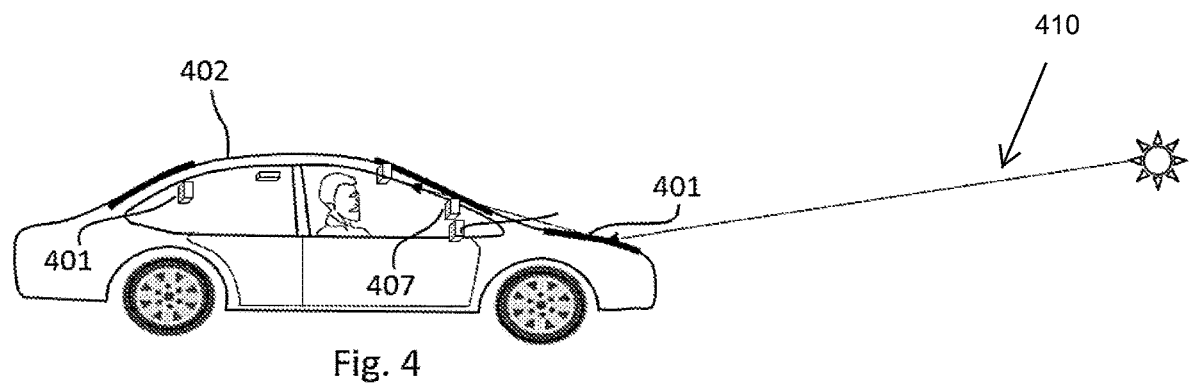
Figure 5:
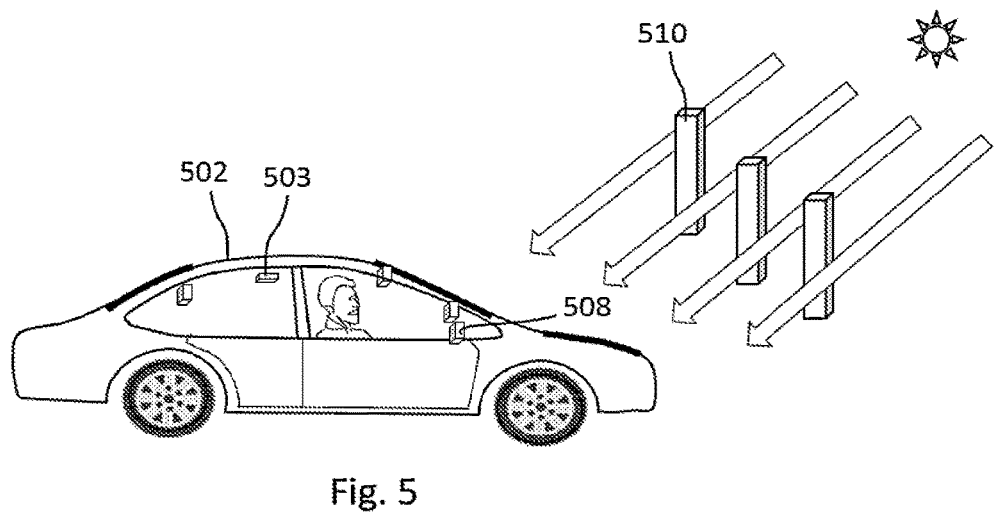
Figure 6:
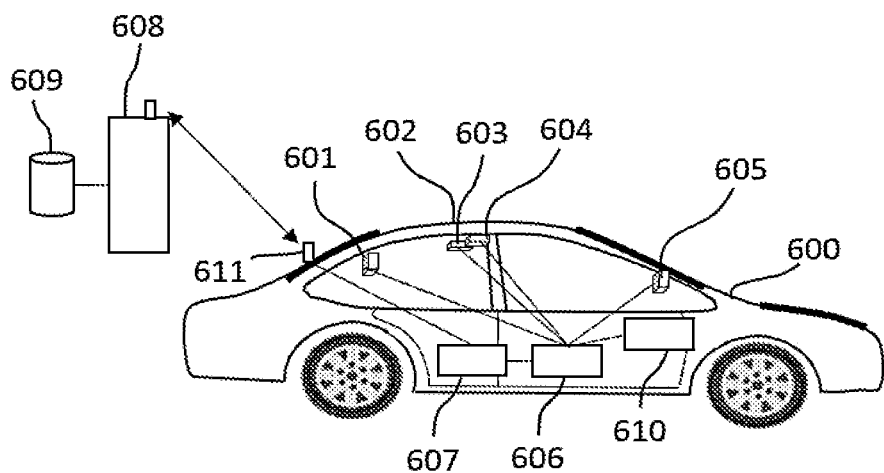
Figure 7:
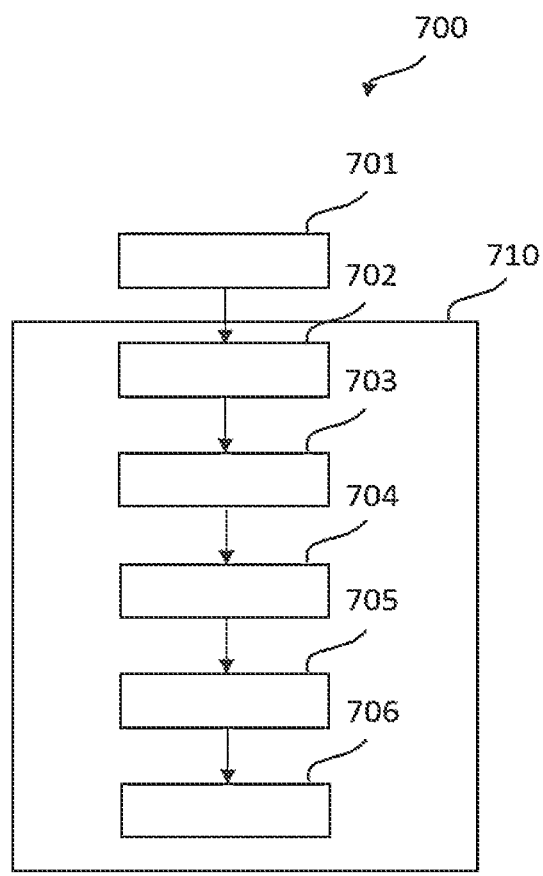

Exemplary embodiments of the invention are represented in the drawings and are explained in greater detail in the following description, wherein:

FIG. 1 shows a block diagram of a driver assistance system for a vehicle for detecting light conditions according to an exemplary embodiment, FIG. 2 shows a vehicle and an established direct dazzling of the driver according to an exemplary embodiment, FIG. 3 shows a vehicle and an established first indirect dazzling of the driver according to an exemplary embodiment, FIG. 4 shows a vehicle and an established second indirect dazzling of the driver according to an exemplary embodiment, FIG. 5 shows a vehicle and an established change from light to dark according to an exemplary embodiment, FIG. 6 shows a vehicle having a system for detecting light conditions according to an exemplary embodiment, FIG. 7 shows a block diagram of the driver assistance method according to an exemplary embodiment.

FIG. 1 shows a block diagram of a driver assistance system 700 for a vehicle 105 for detecting light conditions according to an exemplary embodiment, having a sensor arrangement 102, 103, 104 designed to capture sensor data, having a control device 101 designed to ascertain if the sight of a driver of the vehicle is negatively influenced by a source of stray light 106, 107, 108 external to the vehicle. The sensors 102, 103, 104, e.g. cameras, capture e.g. the surroundings as well as the light of the light source 106, 107, 108 from various sides of the vehicle 105. The sensor data, e.g. images, are subsequently evaluated by the control unit 101 as to whether light sources which negatively influence the driver in the vehicle are present.

FIG. 2 shows a vehicle 202 and an established direct dazzling of the driver according to an exemplary embodiment. A rear camera 201, two lateral cameras 203, only one of which can be seen in the figure, and a front camera 207 capture the surroundings of the vehicle 202. The source of stray light in FIG. 2 is the sun at position 210, which is directly dazzling the driver 204. The source of stray light is identified e.g. on the images captured by the front camera 207 and the windows can be dimmed or a shutter mounted on the windshield 206 can be extended.

If the sun, as represented at position 211, is not detected on the images due to shading caused by e.g. clouds, it can nevertheless be checked if this might possibly dazzle a short time later. To this end, data regarding the sun position, weather data, as well as the evaluation of previously recorded images where the sun was not yet concealed and was detected, or the basic brightness of current images, etc. can be used.

FIG. 2 also shows, by way of example, the various coordinate systems such as a local, vehicle-fixed coordinate system 222, a WGS84 coordinate system 221 for the position and the direction of the vehicle, as calculated by a satellite navigation unit, and the position of the sun is, as a general rule, calculated as an azimuth in relation to the geographical length and elevation with respect to the horizon in a system 220.

By contrast, the sun is not captured at position 212 by the cameras 201, 203, 207, because it is too high. Here, it can be checked if the sun 212 is producing a dazzling effect, or if no such dazzling effect occurs due to the vehicle geometry.

Instead of the sun 210, the headlight of an oncoming car or the light of another light source can also produce a dazzling effect. The incidence of light is likewise detected by means of the front camera 207, the position of the light source is calculated therefrom and the dazzling effect on the driver is calculated. The vehicle geometry and, in particular, also the eye position or eye level are included in the calculation of the dazzling effect, as described above.

FIG. 3 shows a vehicle 302 and an established first indirect dazzling of the driver according to an exemplary embodiment. The sun 310 or another light source shines from the rear through the rear window 301 and is reflected by the rearview mirror 305 so that the driver is dazzled. By way of example, the light source is captured by the rear camera 301 so that the position of the light source can be calculated by the evaluation of the image, as well as the further beam path, including the reflection off the mirror 305.

It is furthermore calculated if the light source 310 hits a display so that the latter cannot be read sufficiently well. If this is the case, the brightness or the contrast of the display can be increased for example.

FIG. 4 shows a vehicle 402 and an established second indirect dazzling of the driver according to an exemplary embodiment. Here, the light 410 first hits the hood 401 and is reflected by it so that the driver is dazzled. The detection is effected e.g. by the camera 407. The calculation is then effected in a similar manner to that described above. Further conditions can also be considered such as e.g. the color of the paint and the curvature of the hood 401.

FIG. 5 shows a vehicle 502 and an established change from light to dark due to e.g. buildings 510 or trees according to an exemplary embodiment. Here, the lateral and front cameras 503, 508 detect a rapid change in the light intensity. In order to avoid flickering due to constantly changing, immediate measures, the measure is effected with a temporal transition.

FIG. 6 shows a vehicle 600 having a system for detecting light conditions according to an exemplary embodiment.

The system 601 . . . 611 has cameras 601, 602, 603, 604 for capturing the surroundings of the vehicle 600. The cameras 601, 602, 603, 604 are connected to a control unit 606. The control unit 606 has a computer-readable medium, on which a program element is saved, which, if it is run on a processor, instructs the processor to execute the method steps in order to detect light conditions and to implement measures in order to reduce or to eliminate disturbing repercussions of the light conditions. The system 601 . . . 611 can further have a navigation system 610 which is based e.g. on satellite navigation, to which further components and sensors such as e.g. speedometers or gyrators can, however, also be joined. Furthermore, the control unit 606 can be connected to a communication unit 607, i.e. a transmitting and receiving unit which sends data regarding the established light conditions and position data of the vehicle 600 via the antenna 611 to a remote server 608 having a database 609. The server can also send corresponding data from the database 609 in the reverse direction to the vehicle 600 so that the control unit 606 can, for example, based on this data and data captured by itself, establish a negative influence of light on the driver and can take measures to counter the negative influence.

The communication unit 607 can, however, also be designed to communicate with other vehicles, in order to thus send data regarding the established light conditions and position data of the vehicle 600 to further vehicles in the surroundings, or to receive corresponding data from these.

FIG. 7 shows a block diagram of a driver assistance method (700) for detecting light conditions according to an exemplary embodiment, having the steps of capturing (701) sensor data and ascertaining (710) if the sight of a driver of the vehicle is negatively influenced by a source of stray light external to the vehicle. Ascertaining (710) if the sight of a driver of the vehicle is negatively influenced by a source of stray light external to the vehicle furthermore has the steps of: detecting (702) sources of stray light in the images, calculating (703) coordinates of the sources of stray light, determining (704) interference-sensitive coordinates, determining (705), on the basis of the coordinates of the sources of stray light and the interference-sensitive coordinates, if there is a negative influence on the driver, and taking (706) measures in order to reduce the negative influence on the driver caused by the source of stray light, if a negative influence has been ascertained.

The invention claimed is:

1. A driver assistance system for a vehicle for detecting light conditions in the vehicle, the driver assistance system comprising:
   a sensor arrangement including a plurality of sensors, each designed to capture images of vehicle surroundings from respective different sides of the vehicle; and
   a control device designed to:
      detect, in the images, sources of stray light external to the vehicle,
      calculate coordinates of the sources of stray light external to the vehicle to determine at least a direction of incidence of the stray light or a position of the sources of stray light in a three-dimensional manner;
      determine interference-sensitive coordinates regarding a negative influence on a driver of the vehicle based on the calculated coordinates of the sources of stray light external to the vehicle, wherein the interference-sensitive coordinates and the coordinates of the sources of stray light external to the vehicle are in the same coordinate system that is used as a common reference system for the sources of stray light or an angle of incidence of the stray light, a position and alignment of the vehicle, and positions of the sources of stray light on the captured image or positions and directions of light sources derived from the sources of stray light;
      ascertain if a sight of the driver of the vehicle is negatively influenced by a source of stray light external to the vehicle based on the coordinates of the sources of stray light and the interference-sensitive coordinates; and
      take measures in order to reduce the negative influence on the driver caused by the source of stray light.

2. The driver assistance system according to claim 1, wherein the control device is further designed to establish a negative influence on the driver in terms of a direct or an indirect dazzling of the driver, and to implement measures in order to avoid the dazzling.

3. The driver assistance system according to claim 1, wherein the control device is further designed to establish a negative influence on the driver in terms of the legibility of internal vehicle displays, and to implement measures in order to increase the legibility of the internal vehicle displays.

4. The driver assistance system according to claim 1, wherein the measure to counter the negative influence brings about a change in status of a vehicle system, and wherein the control device is designed to implement the change in status of the vehicle system over a period of time.

5. The driver assistance system according to claim 1, further comprising:
   a communication channel designed to communicate the occurrence of negative influences or sources of stray light as an information package together with location information.

6. The driver assistance system according to claim 1, wherein the control device is designed to access a personalized profile for at least one calculation or one measure.

7. The driver assistance system according to claim 1, wherein the sources of stray light external to the vehicle include a sun, and the coordinates of the sun are calculated as an azimuth of a geographical length and an elevation above a horizon in relation to a geographical length and an elevation with respect to a horizon in an Earth-centered Earth-fixed (ECEF) coordinate system or a World Geodetic System 1984 (WGS84) coordinate system.

8. The driver assistance system according to claim 1, wherein the interference-sensitive coordinates are position coordinates and direction coordinates of a light falling on eyes of the driver or on an internal vehicle display.

9. A driver assistance method for detecting light conditions, the method comprising:
   capturing sensor data from a plurality of sensors, each designed to capture images of vehicle surroundings from respective different sides of the vehicle;
   detecting, in the images, sources of stray light external to the vehicle;
   calculating coordinates of the sources of stray light external to the vehicle to determine at least a direction of incidence of the stray light or a position of the sources of stray light in a three-dimensional manner;
   determine interference-sensitive coordinates regarding a negative influence on a driver of the vehicle based on the calculated coordinates of the sources of stray light external to the vehicle, wherein the interference-sensitive coordinates and the coordinates of the sources of stray light external to the vehicle are in the same coordinate system that is used as a common reference system for the sources of stray light or an angle of incidence of the stray light, a position and alignment of the vehicle, and positions of the sources of stray light on the captured image or positions and directions of light sources derived from the sources of stray light;
   ascertaining if a sight of the driver of the vehicle is negatively influenced by a source of stray light external to the vehicle; and
   taking measures in order to reduce the negative influence on the driver caused by the source of stray light.

10. The driver assistance system method to claim 9, wherein the sources of stray light external to the vehicle include a sun, and the coordinates of the sun are calculated as an azimuth of a geographical length and an elevation above a horizon in relation to a geographical length and an elevation with respect to a horizon in an Earth-centered Earth-fixed (ECEF) coordinate system or a World Geodetic System 1984 (WGS84) coordinate system.

11. The driver assistance method according to claim 9, wherein the interference-sensitive coordinates are position coordinates and direction coordinates of a light falling on eyes of the driver or on an internal vehicle display.

12. A vehicle comprising the driver assistance system according to claim 1.

* * * * *